United States Patent [19]

Marchbanks

[11] 3,960,195

[45] June 1, 1976

[54] VENTILATED SCREEN FOR MOTOR VEHICLE PASSENGER COMPARTMENT WINDOW OPENINGS

[76] Inventor: Clandes B. Marchbanks, 52 Karen, Pontiac, Mich. 48055

[22] Filed: Dec. 13, 1973

[21] Appl. No.: 424,195

[52] U.S. Cl. .................. 160/105; 160/DIG. 13; 160/353; 160/DIG. 2
[51] Int. Cl.² ................... A47G 5/00; A47H 1/00
[58] Field of Search ............. 160/105, 353, DIG. 2, 160/354

[56] References Cited
UNITED STATES PATENTS

| | | | |
|---|---|---|---|
| 2,131,646 | 9/1938 | Smith | 160/353 |
| 2,223,477 | 12/1940 | Bernier | 160/353 |
| 2,840,162 | 6/1958 | Moerdyk | 160/DIg. 2 |
| 3,679,505 | 7/1972 | Hinderaker et al. | 160/354 |

Primary Examiner—Paul R. Gilliam
Assistant Examiner—Victor N. Sakran
Attorney, Agent, or Firm—Jon C. Winger

[57] ABSTRACT

A ventilating screen for window openings of motor vehicle passenger compartments which provides for the circulation of fresh air into the passenger compartment while the motor vehicle is stopped and moving. The ventilating screen allows the window to be closed completely or partially while still in place in the window opening in the event of inclement weather, and to adjust the amount of air flow. Further, the ventilation screen is easily removable from the window opening with the window either open or closed. The method for fitting the screen to particular window openings provides for its universal application in vertually any motor vehicle, and the method of installing it in the vehicle window opening obviates any modification to the motor vehicle structure.

1 Claim, 4 Drawing Figures

VENTILATED SCREEN FOR MOTOR VEHICLE PASSENGER COMPARTMENT WINDOW OPENINGS

BACKGROUND OF THE INVENTION

1. Field of the Invention

The present invention relates to ventilating devices for installation in window openings, and more particularly to screens to be installed in the window openings of motor vehicle passenger compartments to provide the circulation of fresh air therein.

2. Description of Prior Art

There are prior art ventilation devices for passenger compartments of motor vehicles. However, these prior art devices have proved deficient for a number of reasons.

Some prior art devices utilize a rigid frame over which is stretched a screen material. This construction limits its universal application, requires that the window be completely removed from the window opening, is relatively expensive to make, is relatively difficult to store away when not in use, and could damage the motor vehicle by, for example, scratching the body finish when being removed and installed.

Other prior art devices are essentially formed of louvers forming a rigid panel which is placed in the window opening. These devices have all of the short comings of the above-mentioned prior art devices plus the drawback that they interfer with visibility from inside the passenger compartment, thus, making driving impossible with the device installed and thereby limiting its use to instances where the motor vehicle is parked.

The present invention obviates all of these drawbacks of the prior art and provides for modulating the amount of air coming into the vehicle through the ventilation screen by merely positioning the window at a predetermined location in the window opening.

SUMMARY OF THE INVENTION

The present invention provides a ventilation screen for window openings of motor vehicle passenger compartments comprising a flexible reticulated member having a flexible fastener, such as one half of a zipper connected to its peripheral edge and the other half of the zipper connected to the body structure defining the window opening. The zipper half connected to the vehicle body structure is retained in place by insertion between adjacent body structure components proximate to the window opening, such as between a weather stripping and the body structure adjacent thereto. The ventilation screen is installed in the window opening by fastening the zipper half attached to the reticulated material to the zipper half attached to the vehicle structure.

The method of fitting the ventilating screen to a particular window opening comprises make a template of the window opening by tracing the window opening outline on an appropriate template material, cutting the template material along the traced outline, stretching the flexible reticulated material over the trimmed template and fastening the zipper half to the reticulated material around the periphery of the template.

BRIEF DESCRIPTION OF THE DRAWINGS

The preferred embodiment of the invention is illustrated in the accompanying drawings where like numerals refer to like parts throughout the several views and in which.

DESCRIPTION OF THE PREFERRED EMBODIMENT

Figure 1:
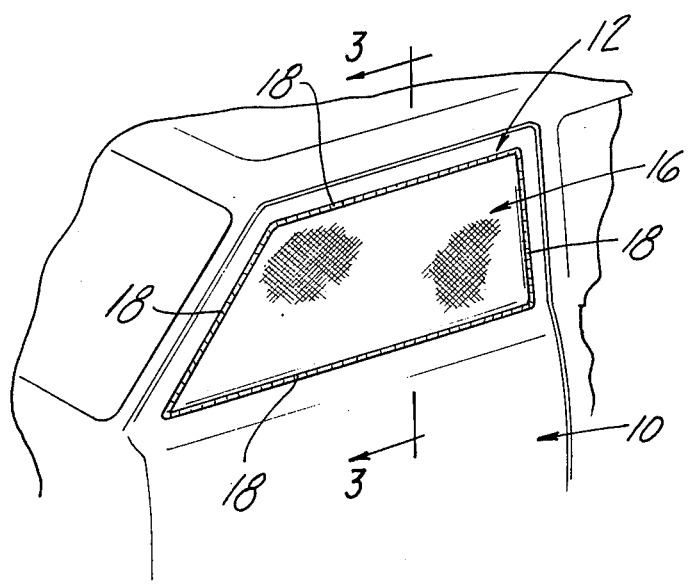
FIG. 1 is a perspective of the ventilating screen of the present invention installed in the window opening of the passenger compartment of a motor vehicle.

Refering to FIG. 1, there is illustrated a portion of a motor vehicle body structure, such as a passenger car door 10 having a window opening 12 therein. Typically, passenger car window openings include weather stripping 14 which seals against the window when it is rolled into position in the window opening to seal against air and moisture leaks.

A ventilation screen, generally denoted as 16, is removably fastened across the window opening 12 by means of a flexible fastening means, such as elongated mating slide fasteners or zipper, generally denoted as 18. Preferrably, the ventilation screen 16 is disposed toward the interior of the vehicle passenger compartment relative to the window which closes the window opening. This allows the ventilator screen 16 to be removed from the window opening with the window closed As can be best seen in FIG. 2, the ventilation screen comprises a flexible reticulated member 20, and the zipper fastener 18. The reticulated member 20 is, for example, fabricated of a fine mesh nylon.

Figure 2:
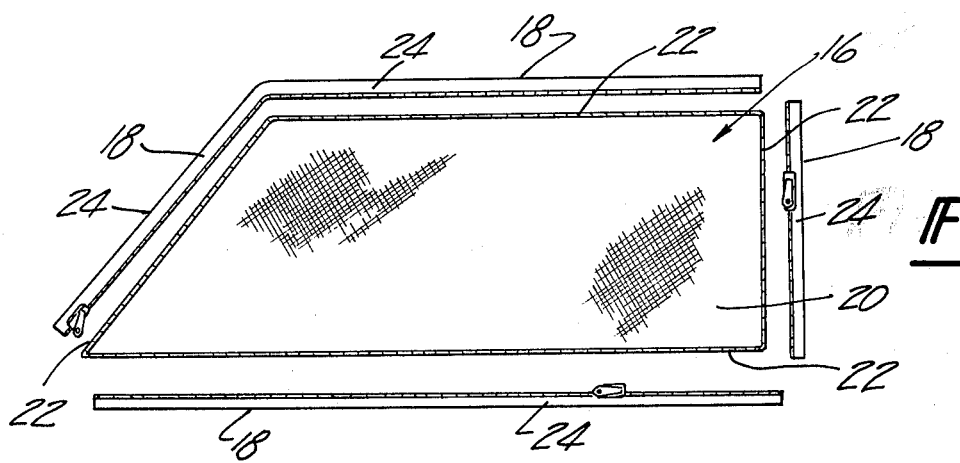
FIG. 2 is an exploded side elevational view of the ventilating screen of FIG. 1.

The zipper fastener 18 is comprised of two chains which interlock. One chain 22 of the zipper fastener 18 is connected to the periphery of the reticulated member 20 by, for example, gluing it thereto. The other chain 24 of the zipper fastener 18 is connected to the vehicle body structure defining the window opening 12 in proximity to the periphery of the window opening. The other chain 24 is illustrated in FIG. 2 as comprising three separate lengths of chain, however, the second chain 24 may comprise any number of separate lengths as may be required by various body structures.

The ventilation screen is secured across the window opening 12 by interlocking the two chains 22 and 24 of the zipper fastener 18.

Figure 3:
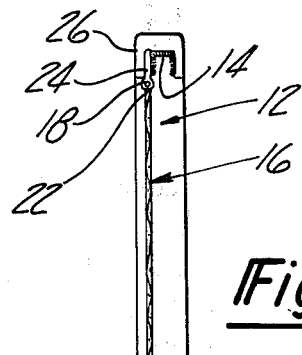
FIG. 3 is a sectional view taken alon line 3—3 of FIG. 1.
Figure 4:
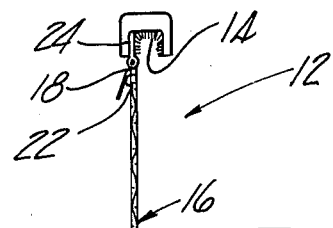
FIG. 4 is a sectional view similar to FIG. 3 showing the ventilation screen installed in another type behicle body structure.

The other chain 24 of the zipper fastener 18 is connected to the vehicle body structure by being inserted between two adjacent body structure components in proximity to the window opening 12. FIG. 3 illustrates these two adjacent body structure components as being the weather stripping 14 and door inner panel 26. FIG. 4 illustrates a slightly different installation wherein the other chain 24 of the zipper is inserted between the door inner panel 26 and a door decore panel 28. It should be understood at this point that vehicle body structure differs slightly, or in detail between vehicle makes and model years. However, the installation of the ventilation screen of the present invention is not predicated on any given body structure. The other chain 24 can be inserted between adjacent body components of any body structure proximate the periphery of the window opening.

If desired, retention of the other chain 24 to the body structure proximate the periphery of the window opening 12 can be assured by gluing it into place.

The reticulated member 20 is fitted to any particular window opening 12 by placing an appropriate template material, such as thin cardboard adjacent to and over the window opening 12 and tracing the outline of the window opening on the template material with, for example, a pencil. Next, the template material is cut along the traced outline with a knife or scissors. The reticulated material from which the ventilation screen is to be made is stretched over the trimmed template, folding the peripheral excess material over the edges of the template and gluing or taping the excess material folded over the template edges to the back side of the template to maintain the reticulated material in its stretched condition thereon. The chain 22 of the zipper fastener is placed around the periphery of the trimmed template partially overlaying the reticulated material. The chain 22 is then connected to the reticulated material by, for example, glue. The reticulated member is cut along the edge of the template and removed therefrom. It is now ready to be installed in the window opening 12.

The foregoing detailed description is given primarily for clarity of understanding and no unnecessary limitations should be understood therefrom, for modifications will be obvious to those skilled in the art upon reading this disclosure and may be made without departing from the spirit of the invention or scope of the appended claims.

I claim:

1. A ventilation screen removably installed in a window opening of a passenger compartment of a motor vehicle, comprising:
   a reticulated member having a peripheral shape generally corresponding to the shape of the window opening;
   one chain of a slide fastener connected to the periphery of said reticulated member; and,
   a mating chain of the slide fastener inserted between a weather strip immediately bordering the window opening and a motor vehicle body structure defining the window opening which weather strip and body structure being disposed toward the interior of the passenger compartment relative to a passenger compartment window which opens and closes in the window opening, said chain inserted between the weather strip and body structure engaging said chain connected to said reticulated member thereby removably fastening said reticulated member across the window opening on the interior side of the passenger compartment relative to the window so that the window can be opened and closed when said reticulated member is fastened across the window opening, and so said reticulated member can be removed from the window opening when the window is closed.

* * * * *